(12) United States Patent
Lee

(10) Patent No.: US 10,895,236 B2
(45) Date of Patent: Jan. 19, 2021

(54) VEHICLE ENGINE CONTROL APPARATUS AND VEHICLE ENGINE CONTROL METHOD

(71) Applicants: HYUNDAI MOTOR COMPANY, Seoul (KR); KIA MOTORS CORPORATION, Seoul (KR)

(72) Inventor: Min Woo Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 73 days.

(21) Appl. No.: 16/274,425

(22) Filed: Feb. 13, 2019

(65) Prior Publication Data

US 2020/0141375 A1    May 7, 2020

(30) Foreign Application Priority Data

Nov. 2, 2018 (KR) .................. 10-2018-0133403

(51) Int. Cl.

| F02N 11/08 | (2006.01) |
|---|---|
| B60R 25/24 | (2013.01) |
| G07C 5/00 | (2006.01) |
| G06F 8/65 | (2018.01) |
| G06K 9/00 | (2006.01) |

(52) U.S. Cl.
CPC ........ *F02N 11/0807* (2013.01); *B60R 25/245* (2013.01); *F02N 11/0811* (2013.01); *G06F 8/65* (2013.01); *G06K 9/00791* (2013.01); *G07C 5/008* (2013.01); *F02N 2300/304* (2013.01)

(58) Field of Classification Search
CPC .............. F02N 11/0807; F02N 11/0811; F02N 2300/304; B60R 25/245; G06F 8/65; G06K 9/00791; G07C 5/008
See application file for complete search history.

(56) References Cited

U.S. PATENT DOCUMENTS

| 5,838,255 A * | 11/1998 | Di Croce ............ B60R 25/1003 340/12.22 |
|---|---|---|
| 8,245,062 B1 * | 8/2012 | Nanda .................... G06F 1/3228 713/320 |
| 8,626,356 B2 * | 1/2014 | Davis .................. F02N 11/0807 123/179.2 |
| 8,825,224 B2 | 9/2014 | Fazi |
| 9,452,732 B1 * | 9/2016 | Hermann ............... B60R 25/305 |
| 10,040,482 B1 * | 8/2018 | Jung ..................... B62D 15/027 |
| 2003/0027548 A1 * | 2/2003 | Wisnia .................... B60R 25/24 455/404.1 |
| 2003/0231550 A1 * | 12/2003 | Macfarlane ........... B60R 25/257 367/198 |

(Continued)

*Primary Examiner* — Hung Q Nguyen
*Assistant Examiner* — Susan E Scharpf
(74) *Attorney, Agent, or Firm* — Brinks Gilson & Lione

(57) ABSTRACT

Disclosed are a vehicle engine control apparatus and a vehicle engine control method. An engine of a vehicle is turned off after a predetermined time elapses when a user gets off the vehicle with a smart key after stopping the vehicle indoors (e.g., a garage or an underground parking lot) while the engine is in an ON state. The engine of the vehicle is maintained in the ON state when there is a user's request. Thus, the ON/OFF state of the engine of the vehicle is may be controlled depending on the user's situation.

16 Claims, 5 Drawing Sheets

(56) References Cited

U.S. PATENT DOCUMENTS

| | | | |
|---|---|---|---|
| 2008/0117079 A1* | 5/2008 | Hassan | B60R 25/045 |
| | | | 340/901 |
| 2013/0079952 A1* | 3/2013 | Fazi | F02D 45/00 |
| | | | 701/2 |
| 2013/0110374 A1* | 5/2013 | Boesch | F02N 11/0837 |
| | | | 701/102 |
| 2016/0061613 A1* | 3/2016 | Jung | G01C 21/26 |
| | | | 701/49 |
| 2017/0186251 A1* | 6/2017 | Lee | G07C 9/20 |
| 2018/0126849 A1* | 5/2018 | Kanagaraj | B60R 25/04 |

* cited by examiner

VEHICLE ENGINE CONTROL APPARATUS AND VEHICLE ENGINE CONTROL METHOD

CROSS-REFERENCE TO RELATED APPLICATION

This application claims priority to and the benefit of Korean Patent Application No. 10-2018-0133403, filed on Nov. 2, 2018, the entire contents of which are incorporated herein by reference.

FIELD

The present disclosure relates to a vehicle engine control apparatus and a vehicle engine control method.

BACKGROUND

The statements in this section merely provide background information related to the present disclosure and may not constitute prior art.

In general, since an engine of a vehicle equipped with a smart key system does not shut off automatically even though its user gets off the vehicle with a smart key, the user is desired to turn off the engine of the vehicle by pressing an engine start/stop button.

In recent years, the vehicle equipped with the smart key system is leading to accidental carbon monoxide poisoning of users, particularly, older ones. That is, with the introduction of the smart key, a procedure of mechanical turning and removing a key from a key box of the vehicle is omitted, and as a result, there is a tendency that the elderly users are forgetting to turn off the engine of the vehicle. In particular, since new cars are quiet, there is a greater possibility that the user mistakenly thinks that the engine has stopped running.

When the user does not turn off the engine of the vehicle in a garage connected to a house, the carbon monoxide, which is colorless, odorless, and initially non-irritating, in exhaust gases of the vehicle flows into the house, and thus, occasionally, the user's family as well as the user are losing their lives or being injured.

We have discovered that when the user gets off the vehicle with the smart key after stopping the vehicle in an enclosed space (e.g., a garage or an underground parking lot) while the engine is in an ON state, a method of automatically turning off the engine after a predetermined time elapses is desired.

SUMMARY

The present disclosure has been made to solve the above-mentioned problems occurring in the prior art while advantages achieved by the prior art are maintained intact.

An aspect of the present disclosure provides a vehicle engine control apparatus and a vehicle engine control method, which are capable of turning off an engine after a predetermined time elapses when a user gets off the vehicle with a smart key after stopping the vehicle indoors (e.g., a garage or an underground parking lot) while the engine is in an ON state and capable of maintaining the engine of the vehicle in the ON state when there is a user's request, thus the ON/OFF state of the engine of the vehicle is controlled depending on a user's situation.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle engine control apparatus includes a smart key system that detects a smart key of a vehicle and a controller that controls an engine of the vehicle based on a user's request when the smart key is located outside the vehicle, which has stopped indoors while the engine is in an ON state.

The controller generates a message that notifies a turn-off of the engine of the vehicle when the smart key is located outside the vehicle, which has stopped indoors while the engine is in the ON state.

The controller turns off the engine of the vehicle after a predetermined time elapses when the user's request in response to the message indicates the turn-off of the engine of the vehicle.

The controller maintains the engine of the vehicle in the ON state even though a predetermined time elapses when the user's request in response to the message indicates a maintenance of the engine of the vehicle in the ON state.

The controller turns off the engine of the vehicle after a predetermined time elapses when no request in response to the message is received from the user.

The controller performs a process, which controls the engine of the vehicle based on the user's request when the smart key is located outside the vehicle, which has stopped indoors while the engine is in the ON state, until the engine of the vehicle is turned off.

The controller determines whether a place where the vehicle has stopped is indoors based on a surrounding image of the vehicle.

The controller determines whether a place where the vehicle has stopped is indoors in conjunction with a navigation device mounted on the vehicle. The controller postpones the turn-off of the engine during a software update of the navigation device.

According to another aspect of the present disclosure, a vehicle engine control method includes: allowing a smart key system to detect a smart key of a vehicle; and controlling, by a controller, an engine of the vehicle based on a user's request when the smart key is located outside the vehicle, which has stopped indoors while the engine is in an ON state.

The controlling of the engine of the vehicle includes generating, by the controller, a message that notifies a turn-off of the engine of the vehicle when the smart key is located outside the vehicle, which has stopped indoors while the engine is in the ON state.

The controlling of the engine of the vehicle includes turning off the engine of the vehicle after a predetermined time elapses when the user's request in response to the message indicates the turn-off of the engine of the vehicle.

The controlling of the engine of the vehicle includes maintaining the engine of the vehicle in the ON state even though a predetermined time elapses when the user's request in response to the message indicates a maintenance of the engine of the vehicle in the ON state.

The controlling of the engine of the vehicle includes turning off the engine of the vehicle after a predetermined time elapses when no request in response to the message is received from the user.

The controlling of the engine of the vehicle includes performing a process, which controls the engine of the vehicle based on the user's request when the smart key is located outside the vehicle, which has stopped indoors while the engine is in the ON state, until the engine of the vehicle is turned off.

The controlling of the engine of the vehicle includes determining whether a place where the vehicle has stopped is indoors based on a surrounding image of the vehicle.

The controlling of the engine of the vehicle includes determining whether a place where the vehicle has stopped is indoors in conjunction with a navigation device mounted on the vehicle. The controlling of the engine of the vehicle includes postponing the turn-off of the engine during a software update of the navigation device.

According to the above, the vehicle engine control apparatus and the vehicle engine control method turn off the engine of the vehicle after the predetermined time elapses when the user gets off the vehicle with the smart key after stopping the vehicle indoors (e.g., a garage or an underground parking lot) while the engine is in the ON state. The engine of the vehicle is maintained in the ON state when there is the user's request, and thus, the ON/OFF state of the engine of the vehicle may be controlled depending on the user's situation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
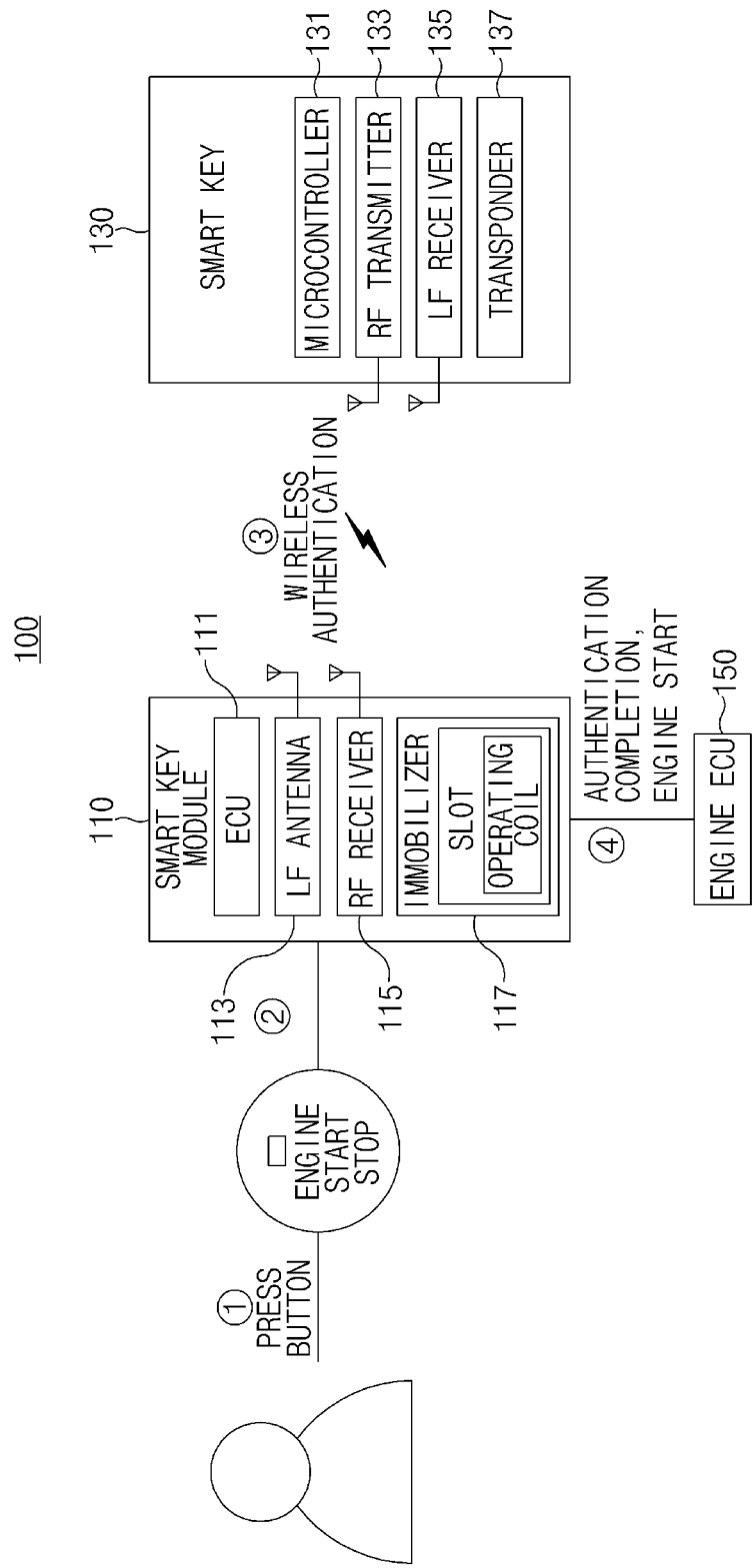
FIG. 1 is a block diagram showing an example of a vehicle smart key system used in the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order not to unnecessarily obscure the gist of the present disclosure.

In describing elements of exemplary forms of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific teams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram showing an example of a vehicle smart key system used in the present disclosure.

Referring to FIG. 1, the vehicle smart key system 100 may include a smart key module 110 installed in a vehicle and a smart key 130 that is carried by a user or that is put inside the vehicle.

According to an operation of the vehicle smart key system 100, when the user presses an engine start button (ENGINE START/STOP) ①, the smart key module 110 is activated ②.

The activated smart key module 110 searches for the smart key 130 via a plurality of LF antennas 113 disposed at respective portions of the vehicle and receives a user authentication code from the searched smart key 130 to perform a wireless authentication ③. That is, the LF antennas 113 transmit an LF authentication request signal from an ECU 111 of the smart key module 110 to the smart key 130. Therefore, the smart key 130 receives the LF authentication request signal via an LF receiver 135, and a microcontroller 131 transmits registered user information to the smart key module 110 via an RF transmitter 133 in response to the LF authentication request signal.

When the RF receiver 115 of the smart key module 110 receives an RF signal and the authentication is completed in the smart key module 110, the ECU 111 outputs a control signal used to turn on an engine to an engine ECU 150 ④. For reference, a reference numeral '117' denotes an immobilizer provided in the smart key module 110, and a reference numeral '137' denotes a transponder provided in the smart key 130.

In one form, the LF antennas 113 may include a driver's seat LF antenna located near a driver's door, a passenger seat LF antenna located near a front passenger door, a first rear LF antenna located near a back seat of the driver's seat, a second rear LF antenna located near a back seat of a front passenger seat, and a trunk LF antenna located near a trunk.

The vehicle smart key system 100 may detect whether the smart key 130 is located inside or outside the vehicle using the driver's seat LF antenna, the passenger seat LF antenna, the first rear LF antenna, the second rear LF antenna, and the trunk LF antenna.

Figure 2:
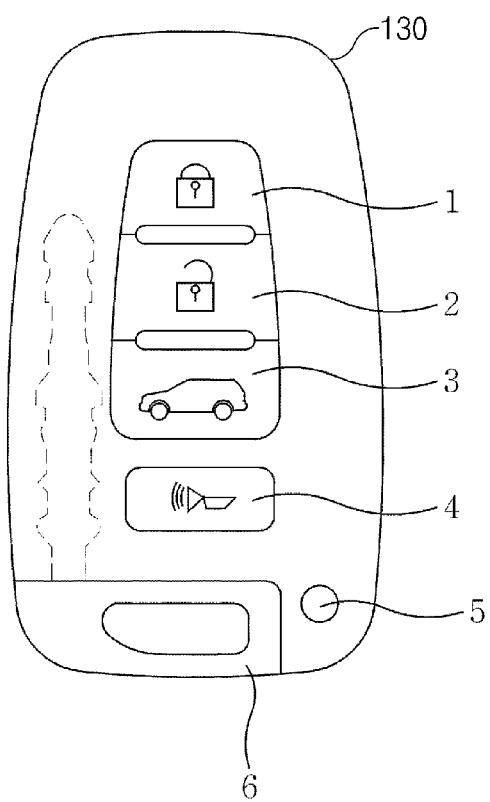
FIG. 2 is a view showing an external structure of a smart key used in the present disclosure.

FIG. 2 is a view showing an external structure of the smart key used in the present disclosure.

Referring to FIG. 2, the smart key 130 used in the present disclosure may include a door lock button 1, a door open button 2, a trunk open button 3, and a horn button 4 of the vehicle, which are disposed on a front surface of the smart key 130, and may include an emergency start key 6 allowing the engine of the vehicle to turn on in emergency by being separated from an external case of the smart key 130 and inserted into a key hole of the vehicle and a key separation button 5 to separate the emergency start key 6 from the smart key 130.

In one form, the emergency start key 6 is fixed to a predetermined portion of the external case by the key separation button 5. When the key separation button 5 is pressed, a fixing portion between the emergency start key 6 and the external case is released by the key separation button 5, and the emergency start key 6 is separated from the external case of the smart key 130.

Accordingly, although a battery of the smart key 130 is fully exhausted and an electronic operation of the smart key 130 is impossible, a user may open the vehicle's door using the emergency start key 6 separated from the smart key 130 and may get on the vehicle.

In addition, the electronic operation of the smart key 130 is still desired to start the engine after the user gets on the vehicle. In this case, when the smart key 130 does not function normally due to its fully exhausted battery, the vehicle does not start even though the user presses the start button to start the engine of the vehicle since the smart key 130 is not authenticated.

To prepare for such a case, the vehicle includes a smart key holder. When the smart key 130 in which the battery is fully exhausted is inserted into the smart key holder, the smart key 130 may be supplied with an emergency power from the smart key holder. Therefore, the smart key 130 may perform the authentication process with the smart key module 110, and the user may start the engine of the vehicle.

Figure 3:
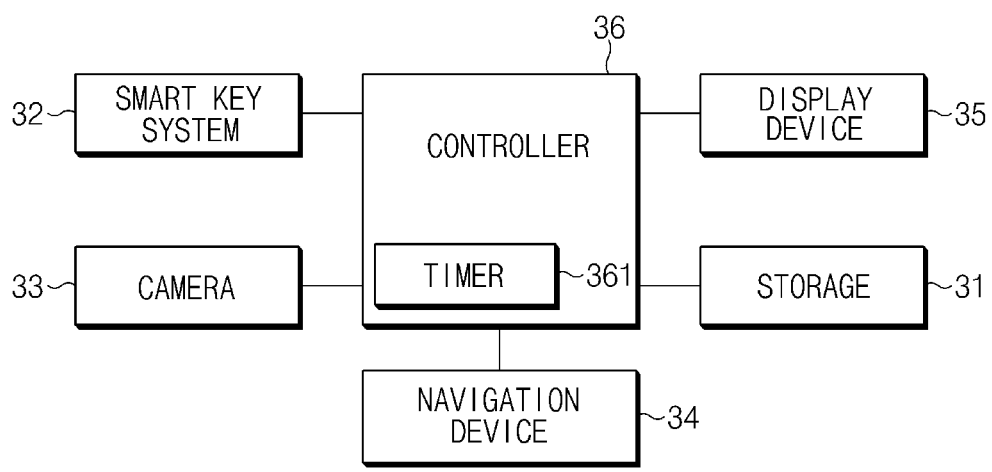
FIG. 3 is a block diagram a vehicle engine control apparatus according to an exemplary form of the present disclosure.

FIG. 3 is a block diagram showing a vehicle engine control apparatus 30 according to an exemplary form of the present disclosure.

Referring to FIG. 3, the vehicle engine control apparatus 30 may include a storage 31, a smart key system 32, a camera 33, a navigation device 34, a display device 35, and a controller 36. According to the vehicle engine control apparatus 30 of the present disclosure, components may be combined with each other in one device, and one or more components may be omitted depending on the manner in which the present disclosure is carried out.

The storage 31 may store various logics, algorithms, and programs desired to turn off the engine of the vehicle after a predetermined time elapses when the user gets off the vehicle with the smart key 130 after stopping the vehicle indoors (e.g., a garage or an underground parking lot) while the engine is in the ON state and to maintain the engine of the vehicle in the ON state when there is a user's request.

In addition, the storage 31 may store time information of a timer 361, which is set by the user or a designer.

Further, the storage 31 may further store information used as a reference to determine whether a place where the vehicle stops is indoors or outdoors based on an image acquired by the camera 33.

Further, the storage 31 may further store location information (e.g., GPS information) for indoors, which are set by the user. For example, when the user specifies a garage location on an electronic map, the GPS information corresponding to the garage are stored in the storage 31.

In addition, the storage 31 may include at least one type of storage medium among a memory of a flash type, a hard disk type, a micro type, and a card type (e.g., a Secure Digital (SD) card or an eXtream Digital (XD) card) and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

Then, the smart key system 32 may have the configuration shown in FIG. 1, may detect whether the smart key 130 is located inside or outside the vehicle, and may transmit the detected information to the controller 36.

The camera 33 may include at least one of a front camera for photographing a front of the vehicle, a rear camera for photographing a rear of the vehicle, a right side camera for photographing a right side of the vehicle, or a left side camera for photographing a left side of the vehicle. In this case, the camera 33 may be the front camera for photographing the front of the vehicle.

In addition, the camera 33 may process an image frame, such as a still image or a moving image, obtained by an image sensor.

Further, the camera 33 may be a stereo camera that acquires a left image and a right image to implement a three-dimensional image.

Then, the navigation device 34 may further include a GPS module that receives a global positioning system (GPS) signal from a satellite and generates first location data of the navigation device 34 based on the received GPS signal, a dead reckoning (DR) sensor that generates second location data based on a driving direction of the vehicle and a speed of the vehicle, a storage (or a memory) that stores map data and various information, a map matching device that generates an estimated location of the vehicle based on the first location data and the second location data, matches the generated estimated location with links (map matching links or map matching roads) in the map data stored in the storage, and outputs the matched map information (map matching result), a communication device that performs a telephone communication through a wireless communication network, a controller that generates road guide information based on the matched road information (map matching result), generates and transmits nearby vehicle state information (e.g., dangerous or faulty condition), or receives an ego-vehicle state information (self-vehicle state information) from nearby vehicles, a display device that displays a road guide map (including information on points of interest) included in the road guide information or the ego-vehicle state information, and a voice output device that outputs road guide voice information (road guide voice message) included in the road guide information. In one form, the communication device may further include a handsfree device having a Bluetooth module.

The display device 35 may include at least one of a liquid crystal display, a thin film transistor-liquid crystal display, an organic light-emitting diode display, a flexible display, or a three-dimensional display.

In addition, the display device 35 may perform not only a display function but also an input function when the display device 35 has a mutual layer structure (hereinafter, referred to as "touch screen") with a sensor (hereinafter, referred to as "touch sensor") that senses a touch operation. In this case, the touch sensor may have a form of a touch film, a touch sheet, or a touch pad.

Figure 4:
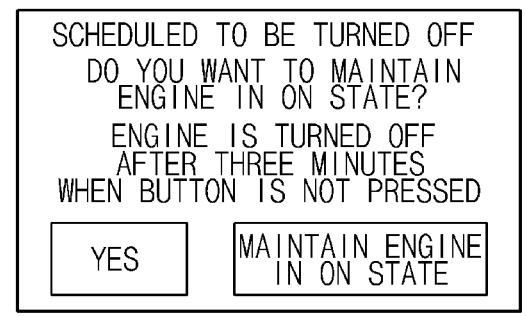
FIG. 4 is a structure diagram of a notification message according to an exemplary form of the present disclosure.

The display device 35 may display a notification message shown in FIG. 4 under the control of the controller 36. In FIG. 4, when the user touches 'YES', the controller 36 determines that the user has approved of turning off the engine and turns off the engine of the vehicle after about three minutes, and when the user touches 'CONTINUOUSLY MAINTAIN ENGINE IN ON STATE', the controller 36 keeps the engine of the vehicle running even after about three minutes has elapsed.

In addition, the display device 35 may be implemented by a display or a cluster of an AVN (audio, video, navigation) system.

Then, the controller 36 performs an overall control so that each component may normally perform its function. The controller 36 may be implemented in a hardware, a software, or a combination of the hardware and the software. In one form, the controller 36 may be implemented by a microprocessor, but it should not be limited to the microprocessor.

In addition, the controller 36 may perform a logic that turns off the engine after the predetermined time elapses when the user gets off the vehicle with the smart key after stopping the vehicle indoors (e.g., the garage or the underground parking lot) while the engine is in the ON state and maintains the engine of the vehicle when there is the user's request.

Further, the controller 36 may obtain information, such as speed, RPM, and stop, of the vehicle via a vehicle network. In the present form, the vehicle network includes a Controller Area Network (CAN), a Local Interconnect Network (LIN), a FlexRay, or a Media Oriented Systems Transport (MOST).

Hereinafter, functions of the controller 36 will be described in more detail.

The controller 36 may determine whether the smart key 130 is located inside or outside the vehicle in conjunction with the smart key system 32 when the engine of the vehicle is in the ON state.

In addition, the controller 36 may determine whether the place where the vehicle stops is indoors (e.g., the garage or the underground parking lot) or outdoors based on the image acquired by the camera 33.

As an example, the controller 36 may recognize an entrance of the garage or underground parking lot based on the image taken by the camera 33 and may determine that the vehicle has stopped indoors when the vehicle stops after entering the entrance.

As another example, the controller 36 may determine that the vehicle has stopped indoors when a traffic light, a traffic sign, a road, and sky are not recognized from the image and there are no movements of objects, e.g., vehicles, trees, or people, in the image.

Meanwhile, the controller 36 may determine whether the place where the vehicle has stopped is indoors or outdoors based on location information registered by the user.

The above-described examples are merely exemplary, and whether the vehicle has stopped indoors may be determined by various methods.

In addition, the controller 36 may determine whether the vehicle has stopped indoors in conjunction with the navigation device 34.

Further, the controller 36 may determine whether the vehicle has stopped indoors by complementarily using the camera 33 and the navigation device 34.

The controller 36 operates the timer 361 and displays the notification message via the display device 35 when determining that the vehicle has stopped indoors (e.g., the garage or the underground parking lot) and the smart key 130 is located outside the vehicle in the state in which the engine of the vehicle is in the ON state. In this case, the controller 36 generates the notification message as shown in FIG. 4.

Then, when the controller 36 receives a user's input that indicates a turn-off of the engine, from the user, the controller 36 turns off the engine of the vehicle after the timer 361 has expired, and when the controller 36 receives a user's input that indicates a maintenance of the engine, from the user, the controller 36 maintains the ON state of the engine even after the timer 361 has expired. In this case, when no response is received until the timer 361 expires, the controller 361 turns off the engine of the vehicle.

Meanwhile, the controller 36 may postpone the turn-off of the engine during a software update of the navigation device 34. That is, the controller 36 may turn off the engine of the vehicle after the software update of the navigation device 34 is completed.

In addition, the controller 36 may repeatedly determine whether a predetermined condition (a state in which the smart key is not located inside the vehicle that has stopped indoors while the engine is in the ON state) is satisfied until the engine of the vehicle is turned off, and the controller 36 operates the timer 361 and controls the display device to display the notification message whenever the condition is satisfied.

Figure 5:
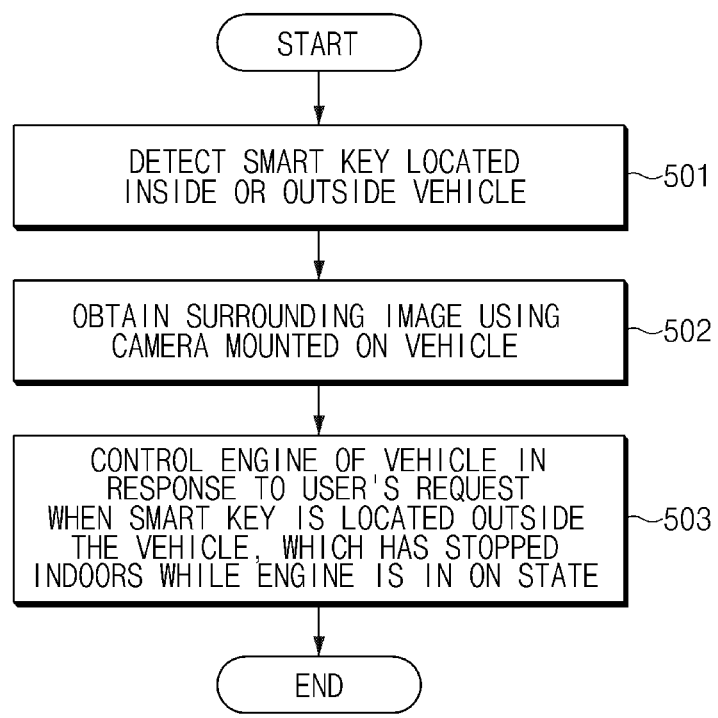
FIG. 5 is a flowchart showing a vehicle engine method control method according to an exemplary form of the present disclosure.

FIG. 5 is a flowchart showing a vehicle engine control method performed when the engine of the vehicle is in the ON state according to an exemplary form of the present disclosure.

The smart key system 32 detects the smart key 130 located inside or outside the vehicle (501). In this case, the smart key 130 indicates a smart key whose authentication is normally completed.

Then, the camera 33 mounted on the vehicle photographs a surrounding image (502).

When the smart key 130 is located outside the vehicle, which has stopped indoors while the engine is in the ON state, the controller 36 controls the engine of the vehicle based on the user's request (503).

That is, when the smart key 130 is located outside the vehicle, which has stopped indoors while the engine is in the ON state, the controller 36 displays the message that notifies the turn-off of the engine of the vehicle as shown in FIG. 4 via the display device 35. Then, the user responds to message. When the response to the message indicates the turn-off of the engine of the vehicle, the controller 36 turns off the engine of the vehicle after the predetermined time elapses, and when the response to the message indicates the ON state maintenance of the engine, the controller 36 maintains the engine in the ON state even though the predetermined time elapses.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. It should be interpreted that all technical ideas which are equivalent to the present disclosure are included in the spirit and scope of the present disclosure.

What is claimed is:

1. A vehicle engine control apparatus comprising:
   a smart key system configured to detect a smart key of a vehicle; and
   a controller configured to:
   control an engine of the vehicle based on a request of a user when the smart key is located outside the vehicle, which has stopped indoors while the engine is in an ON state,
   generate a message that notifies the user of a turn-off of the engine of the vehicle when the smart key is located outside the vehicle, which has stopped indoors while the engine is in the ON state, and
   turn off the engine of the vehicle after a predetermined time elapses when the request of the user in response to the message indicates turning-off the engine of the vehicle.

2. The vehicle engine control apparatus of claim 1, wherein the controller is configured to maintain the engine of the vehicle in the ON state even though a predetermined time elapses when the request of the user in response to the message indicates maintaining the engine of the vehicle in the ON state.

3. The vehicle engine control apparatus of claim 1, wherein the controller is configured to turn off the engine of the vehicle after a predetermined time elapses when no request in response to the message is received from the user.

4. The vehicle engine control apparatus of claim 1, wherein the controller is configured to perform a process, which controls the engine of the vehicle based on the request of the user when the smart key is located outside the vehicle, which has stopped indoors while the engine is in the ON state, until the engine of the vehicle is turned off.

5. The vehicle engine control apparatus of claim 1, wherein the controller is configured to determine whether a place where the vehicle has stopped is indoors based on a surrounding image of the vehicle.

6. The vehicle engine control apparatus of claim 1, wherein the controller is configured to determine whether a place where the vehicle has stopped is indoors in conjunction with a navigation device mounted on the vehicle.

7. The vehicle engine control apparatus of claim 6, wherein the controller is configured to determine that the place where the vehicle has stopped is indoors when the vehicle is located at a registered point.

8. The vehicle engine control apparatus of claim 6, wherein the controller is configured to postpone turning-off the engine during a software update of the navigation device.

9. A vehicle engine control method comprising:
allowing a smart key system to detect a smart key of a vehicle; and
controlling, by a controller, an engine of the vehicle based on a request of a user when the smart key is located outside the vehicle, which has stopped indoors while the engine is in an ON state,
wherein controlling the engine of the vehicle comprises generating, by the controller, a message that notifies the user of a turn-off of the engine of the vehicle when the smart key is located outside the vehicle, which has stopped indoors while the engine is in the ON state,
wherein controlling the engine of the vehicle further comprises turning off the engine of the vehicle after a predetermined time elapses when the request of the user in response to the message indicates turning-off the engine of the vehicle.

10. The vehicle engine control method of claim 9, wherein controlling the engine of the vehicle comprises maintaining the engine of the vehicle in the ON state even though a predetermined time elapses when the request of the user in response to the message indicates maintaining the engine of the vehicle in the ON state.

11. The vehicle engine control method of claim 9, wherein controlling the engine of the vehicle comprises turning off the engine of the vehicle after a predetermined time elapses when no request in response to the message is received from the user.

12. The vehicle engine control method of claim 9, wherein controlling the engine of the vehicle comprises performing a process, which controls the engine of the vehicle based on the request of the user when the smart key is located outside the vehicle, which has stopped indoors while the engine is in the ON state, until the engine of the vehicle is turned off.

13. The vehicle engine control method of claim 9, wherein controlling the engine of the vehicle comprises determining whether a place where the vehicle has stopped is indoors based on a surrounding image of the vehicle.

14. The vehicle engine control method of claim 9, wherein controlling the engine of the vehicle comprises determining whether a place where the vehicle has stopped is indoors in conjunction with a navigation device mounted on the vehicle.

15. The vehicle engine control method of claim 14, wherein controlling the engine of the vehicle comprises determining that the place where the vehicle has stopped is indoors when the vehicle is located at a registered point.

16. The vehicle engine control method of claim 14, wherein controlling the engine of the vehicle comprises postponing turning-off the engine during a software update of the navigation device.

* * * * *